US012666253B2

(12) United States Patent
Zhao et al.

(10) Patent No.: US 12,666,253 B2
(45) Date of Patent: Jun. 23, 2026

(54) COMMUNICATION METHOD AND APPARATUS FOR EXTERNAL DEVICES, ELECTRONIC DEVICE, AND STORAGE MEDIUM

(71) Applicant: ZTE Corporation, Shenzhen (CN)

(72) Inventors: Haifei Zhao, Shenzhen (CN); Lulu Li, Shenzhen (CN); Ruxuan Jiao, Shenzhen (CN); Feng Lv, Shenzhen (CN); Linsong Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 412 days.

(21) Appl. No.: 18/575,420

(22) PCT Filed: Jun. 2, 2022

(86) PCT No.: PCT/CN2022/096990
§ 371 (c)(1),
(2) Date: Dec. 29, 2023

(87) PCT Pub. No.: WO2023/273799
PCT Pub. Date: Jan. 5, 2023

(65) Prior Publication Data
US 2024/0314547 A1 Sep. 19, 2024

(30) Foreign Application Priority Data
Jun. 29, 2021 (CN) .......................... 202110726664.6

(51) Int. Cl.
*H04W 8/26* (2009.01)
*H04L 12/46* (2006.01)
(Continued)

(52) U.S. Cl.
CPC .......... *H04W 8/26* (2013.01); *H04L 12/4641* (2013.01); *H04L 41/0213* (2013.01);
(Continued)

(58) Field of Classification Search
CPC ....... H04W 8/26; H04W 88/08; H04W 24/04; H04L 12/4641; H04L 61/5007;
(Continued)

(56) References Cited

U.S. PATENT DOCUMENTS 7,020,796 B1 3/2006 Ennis et al.
2018/0241716 A1* 8/2018 Roberts ................. H04L 61/106
(Continued)

FOREIGN PATENT DOCUMENTS

CN 102648454 A * 8/2012 ............. H04L 65/40
CN 107360563 A * 11/2017 ........... H04W 88/06
WO 2013122938 A1 8/2013

OTHER PUBLICATIONS

International Search Report for corresponding application PCT/CN2022/096990 filed Jun. 2, 2022; Mail date Jun. 2, 2022.
(Continued)

*Primary Examiner* — Kwang B Yao
*Assistant Examiner* — Bradley D Lytle, Jr.
(74) *Attorney, Agent, or Firm* — CANTOR COLBURN LLP

(57) ABSTRACT

Provided are a communication method and apparatus for an external device, allocating an IP address to the external device to access the base station, wherein the external device is connected to the base station through an Ethernet interface of a destination device; searching corresponding relations between internal IP addresses and Ethernet interfaces for the Ethernet interface corresponding to the allocated internal IP address; determining destination device information corresponding to the destination device to which the found Ethernet interface belongs; searching model data of all external devices for model data comprising the destination device information, and establishing a corresponding relation between the found model data and the allocated internal (Continued)

IP address, wherein the model data is configured to identify the external device; and communicating with the external device identified by the model data through the internal IP address corresponding to the model data.

20 Claims, 4 Drawing Sheets

(51) Int. Cl.

| | |
|---|---|
| *H04L 41/0213* | (2022.01) |
| *H04L 41/0631* | (2022.01) |
| *H04L 41/0806* | (2022.01) |
| *H04L 61/103* | (2022.01) |
| *H04L 61/5007* | (2022.01) |
| *H04L 61/5014* | (2022.01) |

(52) U.S. Cl.
CPC ........ *H04L 61/103* (2013.01); *H04L 61/5007* (2022.05); *H04L 61/5014* (2022.05); *H04L 41/0631* (2013.01); *H04L 41/0806* (2013.01)

(58) Field of Classification Search
CPC ............. H04L 41/0631; H04L 41/0213; H04L 61/103; H04L 61/5014; H04L 41/052; H04L 41/0806; H04L 2101/622; H04L 69/22; H04L 41/145
See application file for complete search history.

(56) References Cited

U.S. PATENT DOCUMENTS

| | | | |
|---|---|---|---|
| 2019/0058690 A1 | 2/2019 | Huang et al. | |
| 2020/0257518 A1 | 8/2020 | Liedtke et al. | |
| 2023/0318971 A1* | 10/2023 | Li | H04L 45/50 |
| | | | 709/238 |

OTHER PUBLICATIONS

Japanese Office Action; Application No. 2023580582; Date of mailing: Oct. 9, 2025; 6 pages.
European Search Report for corresponding application EP22831620; Mail date Sep. 24, 2024.
O-RAN Alliance Working Group 4; Management Plane Specification v05.00 O-RAN. WG4.MP.0-v05.00, Feb. 28, 2021, XP055959009.

* cited by examiner

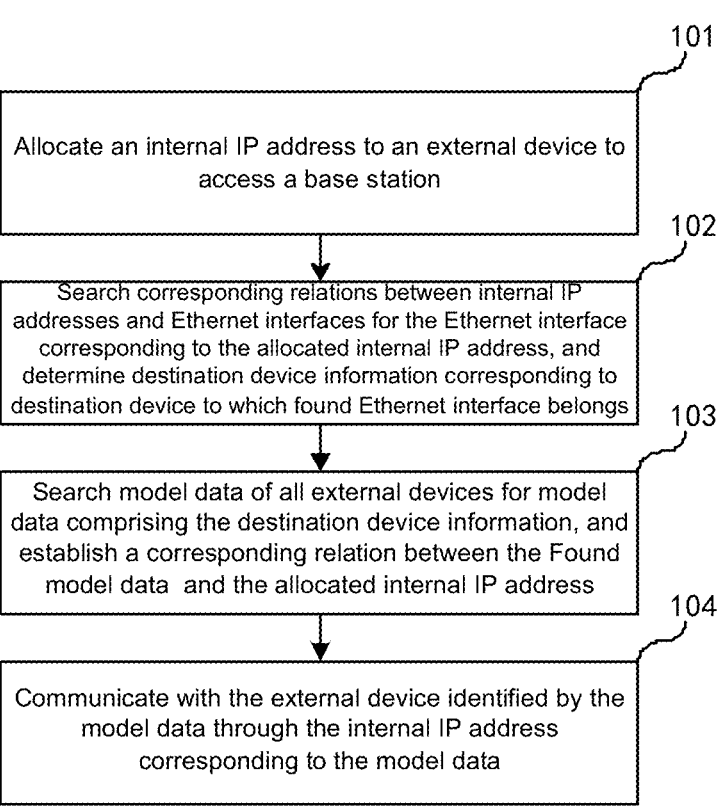

```
                                                                    101

┌─────────────────────────────────────────────────┐
│                                                   │
│   Allocate an internal IP address to an external  │
│   device to access a base station                 │
│                                                   │
└─────────────────────────────────────────────────┘
                                                                    102
                          │
                          ▼
┌─────────────────────────────────────────────────┐
│   Search corresponding relations between internal IP │
│   addresses and Ethernet interfaces for the Ethernet │
│   interface corresponding to the allocated internal  │
│   IP address, and determine destination device       │
│   information corresponding to destination device to │
│   which found Ethernet interface belongs             │
└─────────────────────────────────────────────────┘
                                                                    103
                          │
                          ▼
┌─────────────────────────────────────────────────┐
│   Search model data of all external devices for   │
│   model data comprising the destination device    │
│   information, and establish a corresponding      │
│   relation between the Found model data and the   │
│   allocated internal IP address                   │
└─────────────────────────────────────────────────┘
                                                                    104
                          │
                          ▼
┌─────────────────────────────────────────────────┐
│   Communicate with the external device identified │
│   by the model data through the internal IP       │
│   address corresponding to the model data         │
└─────────────────────────────────────────────────┘
```

Fig. 1

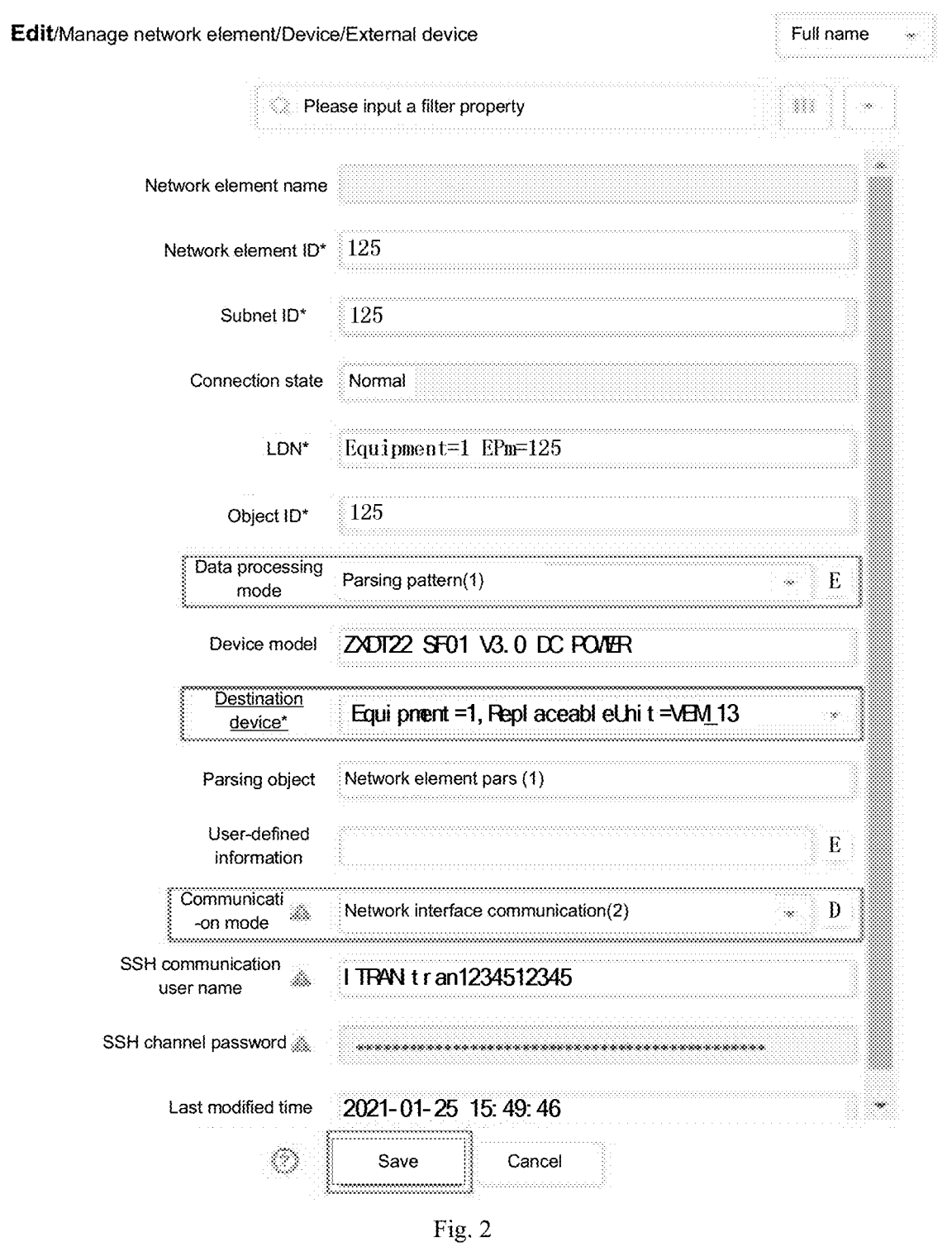

Edit/Manage network element/Device/External device      Full name   ⌄

Please input a filter property

| | |
|---|---|
| Network element name | |
| Network element ID* | 125 |
| Subnet ID* | 125 |
| Connection state | Normal |
| LDN* | Equipment=1 EPm=125 |
| Object ID* | 125 |
| Data processing mode | Parsing pattern(1)   ⌄   E |
| Device model | ZXDT22 SF01 V3.0 DC POWER |
| Destination device* | Equipment =1, Replaceabl eUhi t =VEM_13   ⌄ |
| Parsing object | Network element pars (1) |
| User-defined information | E |
| Communicati -on mode | Network interface communication(2)   ⌄   D |
| SSH communication user name | l TRAN t r an1234512345 |
| SSH channel password | ************************************************ |
| Last modified time | 2021-01-25 15: 49: 46 |

Save     Cancel

Fig. 2

COMMUNICATION METHOD AND APPARATUS FOR EXTERNAL DEVICES, ELECTRONIC DEVICE, AND STORAGE MEDIUM

CROSS-REFERENCE TO RELATED APPLICATION

The disclosure is a national stage filing under 35 U.S.C. § 371 of international application number PCT/CN2020/ 082022, filed Mar. 21, 2022, which claims the priority to a Chinese Application No. 202110726664.6, filed on Jun. 29, 2021, the content of which is incorporated herein by reference in its entirety.

TECHNICAL FIELD

Embodiments of the disclosure relate to the field of communication, and particularly relate to a communication method and apparatus for an external device, an electronic device, and a storage medium.

BACKGROUND

When a base station communicates as a network device, considering the scarcity of the Internet protocol (IP) address resources of an operator, one base station has only one public IP address for operation and maintenance externally, which is usually the IP address of a main control board.

For internal devices of the base station, in order to achieve the communication of the internal devices of the base station and assist a user to monitor and maintain each device of the base station, the base station allocates internal IP addresses to the devices of the base station through a private protocol, and the internal IP addresses are invisible to the user. Corresponding model data is created for each device of the base station and presented to the user. Accordingly, the devices of the base station can be determined and maintained by the user on the basis of the model data. The base station typically establishes corresponding relations between internal IP addresses and model data through a private protocol. Therefore, when the base station receives an operation on the base station through the model data from a user, the base station can obtain the internal IP address of the device corresponding to the model data, and then communicate with the internal device of the base station.

As the fifth generation of mobile communication technology (5G) develops rapidly, the O-RAN Alliance proposes that base station devices will have open software interfaces in future to support the interoperability of radio-frequency devices from different manufacturers, thus reducing the dependence on private platforms and improving the flexibility of network device access. That is to say, external devices will also access the base station. When an external device accesses a base station, an environmental monitoring board of the base station will provide a serial port to be connected to the external device, so the external device can be monitored and maintained.

However, connecting an external device through a serial port slows a serial port rate down and can no longer satisfy the information transmission requirements of the external device.

SUMMARY

Embodiments of the disclosure provide a communication method for an external device. The communication method includes: allocating an internal Internet protocol (IP) address to the external device to access the base station, where the external device is connected to the base station through Ethernet interface of a destination device; searching corresponding relations between internal IP addresses and Ethernet interfaces for the Ethernet interface corresponding to the internal IP address that is allocated; determining destination device information corresponding to the destination device to which the Ethernet interface that is found belongs; searching model data of all external devices for model data comprising the destination device information, and establishing a corresponding relation between the model data that is found and the internal IP address that is allocated, where the model data is configured to identify the external device; and communicating with the external device identified by the model data through the internal IP address corresponding to the model data.

The embodiments of the disclosure further provide a communication apparatus for an external device. The communication apparatus includes: an allocation module configured to allocate an internal IP address to the external device to access the base station, where the external device is connected to the base station through an Ethernet interface of a destination device; a searching module configured to search corresponding relations between internal IP addresses and Ethernet interfaces for the Ethernet interface corresponding to the internal IP address that is allocated; determine destination device information corresponding to the destination device to which the Ethernet interface that is found belongs; and search model data of all external devices for model data comprising the destination device information, and establish a corresponding relation between the model data that is found and the internal IP address that is allocated, where the model data is configured to identify the external device; and a communication module configured to communicate with the external device identified by the model data through the internal IP address corresponding to the model data.

The embodiments of the disclosure further provide an electronic device. The electronic device includes at least one processor, and a memory communicatively connected to the at least one processor. The memory stores an instruction executable by the at least one processor, and the instruction is executed by the at least one processor, to cause the at least one processor to execute the above communication method for an external device.

The embodiments of the disclosure provide a computer-readable storage medium, storing a computer program, where the computer program implements the above communication method for an external device when executed by a processor.

BRIEF DESCRIPTION OF THE DRAWINGS

One or more embodiments are illustrated by way of figures of the corresponding accompanying drawings, and are not to be construed as limiting the embodiments.

FIG. 1 is a flowchart of a communication method for an external device according to an example of the disclosure;

FIG. 2 is a schematic diagram of a model data configuration interface of a device according to an example of the disclosure;

DETAILED DESCRIPTION OF THE EMBODIMENTS

Figure 3:
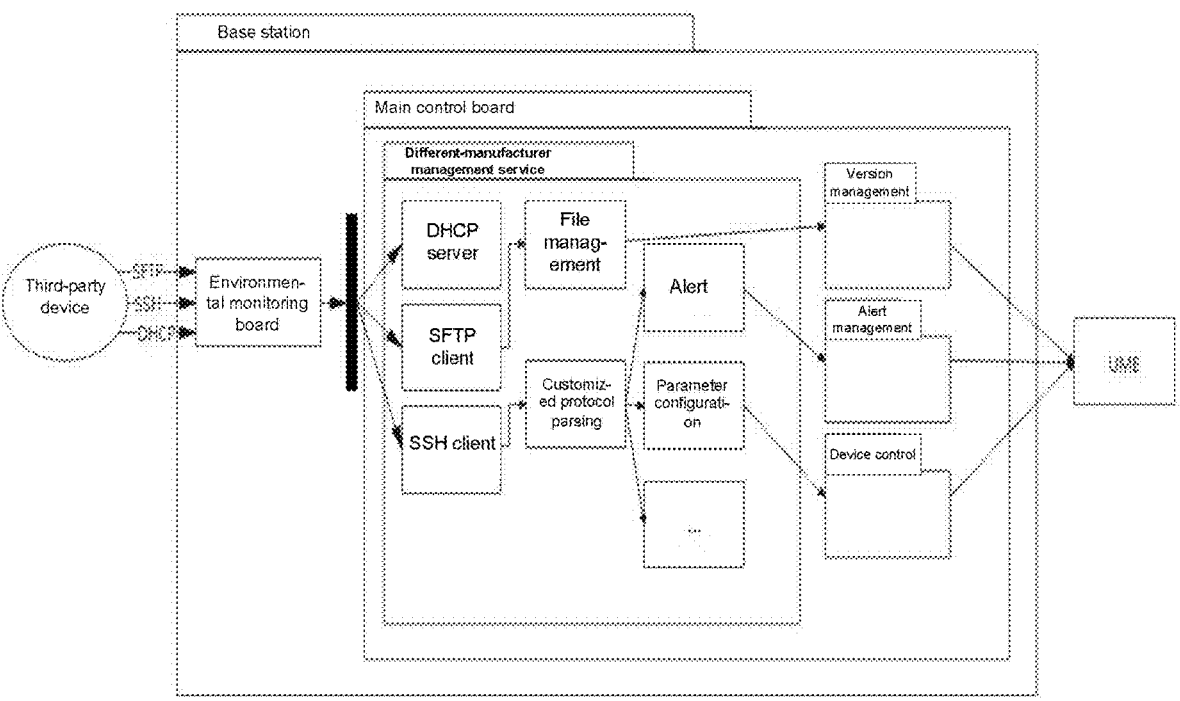
FIG. 3 is a schematic diagram of communication connection between an external device, a base station and a unified management expert according to an example of the disclosure.

In order to make the objectives, technical solutions and advantages of the embodiments of the disclosure clearer, the embodiments of the disclosure will be described in detail below in conjunction with the accompanying drawings. However, it can be understood by those of ordinary skill in the art that in various embodiments of the disclosure, numerous technical details are set forth in order for the reader to better understand the disclosure. However, the technical solution claimed in the disclosure can also be implemented without these technical details and various changes and modifications based on the following embodiments. The following embodiments are divided for convenience of description, which should not be constituted as any limitation on the specific implementation mode of the disclosure. Each example can be combined and referred to each other without contradiction.

A main purpose of the embodiments of the disclosure is to provide a communication method and apparatus for an external device, an electronic device and a storage medium, which can improve a communication rate between the external device and a base station, satisfy information transmission requirements of the external device, and facilitate operation and maintenance for the external device.

The embodiments of the disclosure provide a communication method for an external device, applied to a base station. The communication method for an external device in the example includes: allocate an internal Internet protocol (IP) address to the external device to access the base station, where the external device is connected to the base station through an Ethernet interface of a destination device; search corresponding relations between internal IP addresses and Ethernet interfaces for the Ethernet interface corresponding to the internal IP address that is allocated; determine destination device information corresponding to the destination device to which the Ethernet interface that is found belongs; search model data of all external devices for model data comprising the destination device information, and establish a corresponding relation between the model data that is found and the internal IP address that is allocated, where the model data is configured to identify the external device; and communicate with the external device identified by the model data through internal IP address corresponding to the model data.

Compared with a case of connecting an external device to a base station by means of a serial port, in the example, a data transmission speed is higher through the Ethernet connection interface. Furthermore, in the example of the disclosure, the internal IP address is allocated to the external device without occupying a public IP address, thereby saving public IP address resources of an operator. In the example, after the IP address is allocated to the external device, the model data of the external device is determined through corresponding relation between the Ethernet interface and the destination device information. Therefore, the corresponding relation between the internal IP address of the external device and the model data of the external device is achieved, such that when a user needs to operate and maintain the external device by means of the model data, the IP address corresponding to the model data can be identified, and then the user can communicate with the external device. The corresponding relation between the internal IP address and the model data of the external device can be achieved without adding information to the model data, such that on the basis of not changing existing operation and maintenance model data of the wireless base station and not exposing a private customized protocol off the base station, allocation of the internal IP addresses and binding between the internal IP addresses and the model data are implemented, then communication with the external device through the Ethernet is facilitated, and external device can be operated and maintained.

Implementation details of the communication method for an external device according to the example are described in detail below. The following contents are merely implementation details provided for convenience of understanding, and are not necessary for implementing the solution.

Step 101, an internal IP address is allocated to an external device to access a base station. The external device is connected to the base station through an Ethernet interface of a destination device. The base station may allocate the internal IP address to the external device by means of a dynamic host configuration protocol (DHCP). The internal IP address is a private IP address. The external device is an external device connected to the base station for being managed, such as an embedded power supply, which is not limited herein. The destination device may be a device of the base station, and may transmit data of the external device to the base station transparently, and transmit data of the base station to the external device transparently. The external device accesses the base station through the Ethernet interface of the destination device. For example, an environmental monitoring board may be the destination device.

Illustratively, with reference to FIG. 2, FIG. 2 is a schematic diagram of a user interface provided by a unified management expert. A user may configure the model data of the external device according to a base station device model. The device model may include a device model of an access device, a destination device, a data processing mode, a communication mode, a model data identifier, etc. The data processing mode includes a parsing mode, a transparent transmission mode, etc. The communication mode includes network port communication, serial port communication, etc. In the example, the data processing mode may be configured as the parsing mode, and the communication mode may be configured as the network port communication. In actual use, the user can perform configuration according to requirements. The destination device is a base station device accessed by the external device, for example, an environmental monitoring board. A model of the environmental monitoring board and an interface connected to the external device may be configured in a destination device field shown in FIG. 2. The external device is connected to an Ethernet interface of the environmental monitoring board. The environmental monitoring board of the base station can play a similar role as a switch, and can transmit the data of the external device to a main control board of the base station. The main control board processes the data transmitted from the external device. For example, a dynamic host configuration protocol (DHCP) client of the external device initiates an IP request, and a DHCP server on the main control board of the base station receives the IP request transmitted through the monitoring board, and allocates the internal IP address to the external device to access the base station.

Step 102, corresponding relations between internal IP addresses and Ethernet interfaces are searched for the Ethernet interface corresponding to the internal IP address that is allocated, and destination device information corresponding to the destination device to which the Ethernet interface that is found belongs is determined.

Illustratively, the main control board may search a switch chip for an Ethernet interface corresponding to the internal IP address that is allocated through corresponding relations between Ethernet interfaces and internal IP addresses. The base station may obtain device information of a destination device such as an environmental monitoring board connected to the external device through the corresponding Ethernet interface. In the related art, control over the external device is based on the model data of the device, and the base station cannot determine the correspondence between the model data of the device model and the internal IP address. In the example, by maintaining the corresponding relations between internal IP addresses and Ethernet interfaces, a corresponding relation between the model data and the internal IP address can be found. Therefore, no additional information related to a media access control (MAC) address of the base station device needs to be added to the model data, and operation and maintenance costs are reduced.

Step 103, model data of all external devices are searched for model data comprising the destination device information, and a corresponding relation between the model data that is found and the internal IP address that is allocated is established. The model data is configured to identify the external device.

Illustratively, the destination device shown in FIG. 2 includes the device information of the environmental monitoring board, and then the allocated IP address has a corresponding relation with the model data configured by the user in the unified management expert. That is to say, the base station establishes a corresponding relation between the model data of the external device and the IP address of the external device, such that when the user operates by means of the model data, the base station can obtain the address of the external device corresponding to the model data, so as to communicate with the external device.

Step 104, communication with the external device identified by the model data is established through internal IP address corresponding to the model data.

For example, the user can establish service channels using different protocols, for example, a secure shell protocol (SSH), a secret file transfer protocol (SFTP), a network configuration protocol (NETCONF), a hyper text transfer protocol (HTTPS) over a secure socket layer, etc., according to data transmission requirements, so as to implement secure communication between the base station and the external device and complete interaction at a service level.

In some embodiments, according to the internal IP address in a message that is received, the base station determines that the message is a message of the external device identified by the model data. The message of the external device identified by the model data is guided to a virtual port of a service container by using a virtual local area network (VLAN) technology and a container technology. The message at the virtual port in the service container is monitored. That is to say, when the message of the external device is received, the VLAN technology and the container technology may be used to guide the message of the external device to the virtual port of the specific service container, and a service layer monitors the message at the virtual port in the container. In the example, VLAN isolation is achieved on the main control board by guiding the message to the virtual port of the service container, such that isolation of a communication service of the external device in the base station from other core services of the base station is achieved. Malicious use of the destination device, such as destroying communication data of the base station through the Ethernet port of the environmental monitoring board is avoided, such that a scope of security management of the base station is reduced to a controllable range, and security requirements of communication of the base station are satisfied.

In some embodiments, a service channel is established with the external device identified by the model data through corresponding internal IP address. Communication with the external device is established through the established service channel according to a customized application layer protocol. In the example, the data to be transmitted to the external device is encapsulated by the customized application layer protocol, such that the external device can identify the data. The data from the external device is decapsulated, such that the base station can parse the data of the external device and upload the data to the unified management expert. In the example, considering that the external device is a different-manufacturer device, that is, when a manufacturer of the external device is different from that of the base station device, a data format, etc. in the external device may be different from that in the device of the base station, compatibility between the external device and the internal device of the base station is achieved by means of the customized application layer protocol. Therefore, the external device can be conveniently operated and maintained, for example, parameters of the external device can be configured remotely, file transfer, version management, real-time data monitoring and alert can be performed remotely.

With reference to FIG. 3, the external device, that is, a third-party device, is connected to the environmental monitoring board of the base station, and the base station is connected to the unified management expert (UME). Operation and maintenance for the external device are integrated into traditional operation and maintenance for the base station. The third-party device can establish SFTP, SSH and DHCP service channels with the base station for data transmission. The data is guided to the virtual port of the service container by means of the VLAN technology and the container technology, such that security of the base station is improved. The transmitted data is parsed by means of the customized protocol, that is, the customized application layer protocol, such that a specific content of the transmitted data is obtained; and alternatively, the data to be transmitted to the external device is encapsulated by means of the customized protocol, such that remote file management, version management, alert management, device control, etc. are implemented by means of the unified management expert. The external device can be operated and maintained without additional unified management experts of the external device.

In some embodiments, an alert request is periodically sent to the external device identified by the model data through the established service channel according to the customized application layer protocol. In a case that an alert state message of the external device is received, the alert state message is parsed, and an alert state of the external device is obtained. The alert state of the external device is transmitted to a unified management expert.

For example, an alert management service in the base station requests the alert state of the external device every 2 S. An external device management service in the base station queries the external device through the SSH channel according to the customized protocol, that is, sends an alert request, and the external device responds to the base station through the SSH channel after receiving the alert request, that is, sends an alert state message to the base station. The external device management service of the base station parses the alert state message according to the customized application layer protocol, obtains the alert state of the external device, and transmits the parsed alert state to an alert management service. The alert management service reports the alert to the unified management expert or recovers the alert according to the alert state of the external device.

In some embodiments, an operation instruction issued by the unified management expert and based on the model data is obtained. The internal IP address corresponding to the model data is obtained according to the operation instruction based on the model data. The operation instruction is transmitted to the external device through the established service channel according to the customized application layer protocol.

In some embodiments, the operation instruction includes any one or combination of a parameter configuration instruction, a version switching instruction, a file transfer instruction, and a user name and password change instruction. In a case that the operation instruction is the parameter configuration instruction, the version switching instruction or the user name and password change instruction, the service channel that is established is a SSH service channel, and in a case that the operation instruction is the file transfer instruction, the service channel that is established is a SFTP service channel.

For example, the unified management expert issues a parameter configuration command to the base station device management service of the base station. The parameter configuration command is specifically a parameter change command, for example, to change that a power supply of the external device stops working at 80° C. to that the power supply stops working at 90° C. The base station device management service issues the parameter change command to the external device management service of the base station. The external device management service sends the parameter change command to the external device through the SSH channel according to the customized protocol. After receiving the parameter change command, the external device changes parameters and transmits a change response message to the base station through the SSH channel. The external device management service of the base station parses the change response message according to the customized application layer protocol. The external device management service of the base station responds to the base station device management service. The base station device management service responds to the unified management expert.

In some embodiments, the base station supports the SFTP client, that is, supports the SFTP protocol, and can transfer files through the SFTP service channel. In a case that the external device needs to support file transfer, the external device can support a server of the SFTP protocol. The client can first transmit a file to the base station by means of the unified management expert, and then the base station sends the file to the external device, for example, a power supply, according to a user instruction. The base station may issue a version upgrade command, the external device may perform remote version upgrade according to the command, and a version file may be transmitted to the external device by means of a file transfer function.

The unified management expert may issue a file to the base station remotely and transmit the file to the external device by means of the base station. For example, a file in a file transfer instruction is specifically a version file. The unified management expert issues the version file to the base station through the SFTP service channel. A base station version management module transmits a file path of the version file to the external device management service of the base station. The external device management service transmits the file to the external equipment through the SFTP service channel. The external device management service responds to the unified management expert.

After receiving a version switching instruction issued by the unified management expert, the base station version management module transmits the version switching instruction to the external device management service. The external device management service notifies the external device through the SSH channel after encoding according to the customized application layer protocol. The external device notifies the base station after processing. The external device management service notifies a version management module after decoding. The version management module returns a result to the unified management expert.

In some embodiments, in a case that the operation instruction includes a password change instruction, after a response message indicating that password change of the external device succeeds is received from the service channel, the method further includes store a user name and a password into a database.

Illustratively, when the external device is initially connected to the base station, the user may input a user name and a password of the external device, for example, a power supply, on the unified management expert, and change the user name and the password periodically for the sake of security. After the power supply is connected to the base station, in a case that the base station or the power supply has version upgrade, reset and other operations, the user name and the password can be stored in a database, such that it is guaranteed that the base station or the power supply can remember the password. After the base station or the power supply is started, normal connection of the external device can be guaranteed without requiring re-input by the user. After the external device is connected to another base station, the user needs to re-enter the password.

Figure 4:
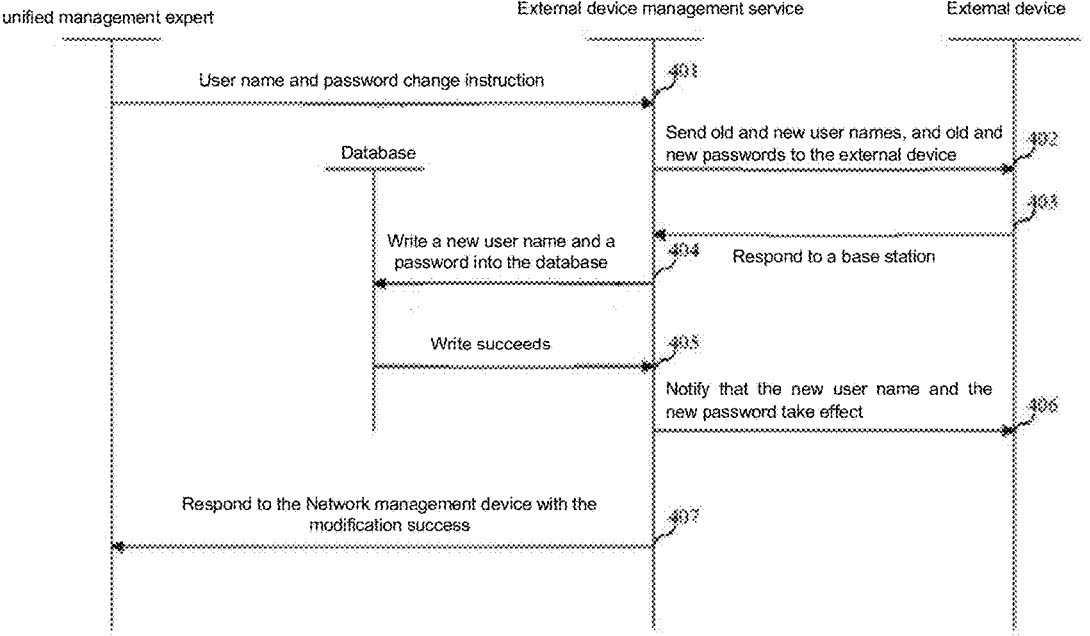
FIG. 4 is a flowchart of changing a user name and a password according to an example of the disclosure.

With reference to FIG. 4, a flowchart of interaction between an external device, a unified management expert and an external device management service in a base station when a password is changed is shown.

Step 401: the unified management expert sends a user name and password change instruction to the external device management service. The user name and password change instruction may include a new user name and password.

Step 402: the external device management service sends old and new user names and old and new passwords to the external device. In the example, the new user name and password and the old user name and password are sent to the external device. Only the new user name and password may be sent to the external device in an actual application process. In a case that only the user name is updated, only the new user name may be sent. In a case that only the password is updated, only the new password may be sent, which is not limited herein.

Step 403: the external device responds to the base station after receiving the old and new user names and passwords.

Step 404: the external device management service writes the new user name and password into a database.

Step 405: after writing the new user name and password, the database notifies the external device management service of write success.

Step 406: the external device management service notifies the external device that the new user name and password are valid.

Step 407: the external device management service responds to the unified management expert with change success.

In the example, compared with a case of connecting an external device by means of a serial port, connecting the external device through the Ethernet has a higher rate. In the example, the internal IP address is allocated to the external device without occupying a public IP address, thereby saving public IP address resources of an operator. The model data of the external device is determined through corresponding relation between the Ethernet interface and the destination device information. Therefore, the corresponding relation between the internal IP address of the external device and the model data of the external device is achieved, such that when a user needs to operate and maintain the external device by means of the model data, the IP address corresponding to the model data can be identified, and then the user can communicate with the external device. The corresponding relation between the internal IP address and the model data of the external device can be achieved without adding information to the model data, such that on the basis of not changing existing operation and maintenance model data of the wireless base station and not exposing a private customized protocol off the base station, allocation of the internal IP addresses and binding between the internal IP addresses and the model data are implemented, and then communication with the external device through the Ethernet is facilitated. Moreover, through the customized application layer protocol, the external device is compatible with the base station, monitoring the alert and real-time data of the external device are convenient, and common parameters of the external device can also be remotely set. Remote file transfer and version upgrade management for the external device are also implemented.

Division of steps of the above methods is merely for clarity of description, and can be combined into one step or split into several steps during implementation, as long as the same logical relation is included, all of which fall within the scope of protection of this patent. Insignificant modifications added or insignificant designs introduced to an algorithm or a process without changing the core design of the algorithm and the process fall within the scope of protection of this patent.

Figure 5:
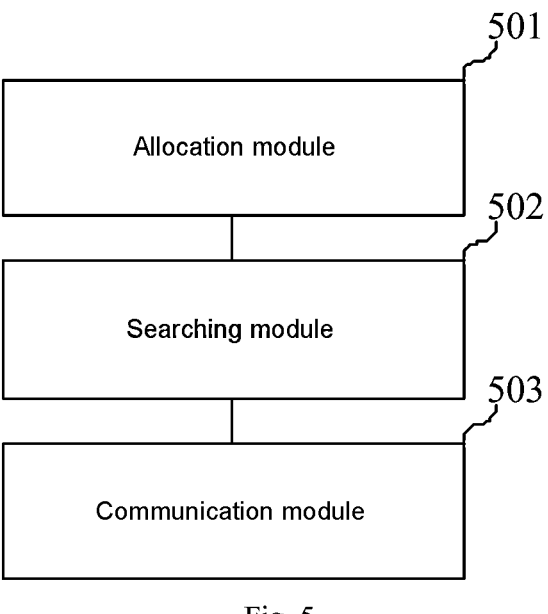
FIG. 5 is a schematic diagram of a communication apparatus of an external device according to an example of the disclosure.

The embodiments of the disclosure further relate to a communication apparatus for an external device. As shown in FIG. 5, the communication apparatus includes: an allocation module 501 configured to allocate an internal IP address to the external device to access the base station, where the external device is connected to the base station through an Ethernet interface of a destination device; a searching module 502 configured to search corresponding relations between internal IP addresses and Ethernet interfaces for the Ethernet interface corresponding to the internal IP address that is allocated, determine destination device information corresponding to the destination device to which the Ethernet interface that is found belongs, search model data of all external devices for model data comprising the destination device information, and establish a corresponding relation between the model data that is found and the internal IP address that is allocated, where the model data is configured to identify the external device; and a communication module 503 configured to communicate with the external device identified by the model data through internal IP address corresponding to the model data.

In some embodiments, the communication module 503 is further configured to establish a service channel with the external device identified by the model data through corresponding internal IP address; and communicate with the external device through the established service channel according to a customized application layer protocol.

In some embodiments, the communication module 503 is further configured to periodically send an alert request to the external device identified by the model data through the established service channel according to the customized application layer protocol; parse, in a case that an alert state message of the external device is received, the alert state message, and obtain an alert state of the external device; and transmit the alert state of the external device to a unified management expert.

In some embodiments, the communication module 503 is further configured to obtain an operation instruction issued by the unified management expert and based on the model data; obtain the internal IP address corresponding to the model data according to the operation instruction based on the model data; and transmit the operation instruction to the external device through the established service channel according to the customized application layer protocol.

In some embodiments, the operation instruction in the communication module 503 includes any one or combination of a parameter configuration instruction, a version switching instruction, a file transfer instruction, and a user name and password change instruction. In a case that the operation instruction is the parameter configuration instruction, the version switching instruction or the user name and password change instruction, the service channel that is established is a SSH service channel, and in a case that the operation instruction is the file transfer instruction, the service channel that is established is a SFTP service channel.

In some embodiments, in a case that the operation instruction includes a password change instruction, after a response message indicating that password change of the external device succeeds is received from the service channel, a user name and a password are stored into a database.

In some embodiments, according to the internal IP address in a message that is received, it is determined that the message is a message of the external device identified by the model data; the message of the external device identified by the model data is guided to a virtual port of a service container by using a VLAN technology and a container technology; and the message at the virtual port in the service container is monitored.

It is not difficult to find that the example is an apparatus example corresponding to the above method example, and the example can be implemented in cooperation with the above method example. The relevant technical details mentioned in the above method example are still valid in this example, and are not repeated herein in order to reduce repetition. Accordingly, the related technical details mentioned in this example can also be applied to the first example.

It is worth mentioning that all modules machines involved in the embodiments are logic modules. In practical application, one logic unit may be a physical unit, may also be part of a physical unit, and may also be achieved by combining a plurality of physical units. Furthermore, in order to highlight the innovative part of the disclosure, units which are less closely related to solving the technical problem of the disclosure are not introduced in the embodiments of the disclosure, but this does not indicate that no other units are present in the embodiments.

Figure 6:
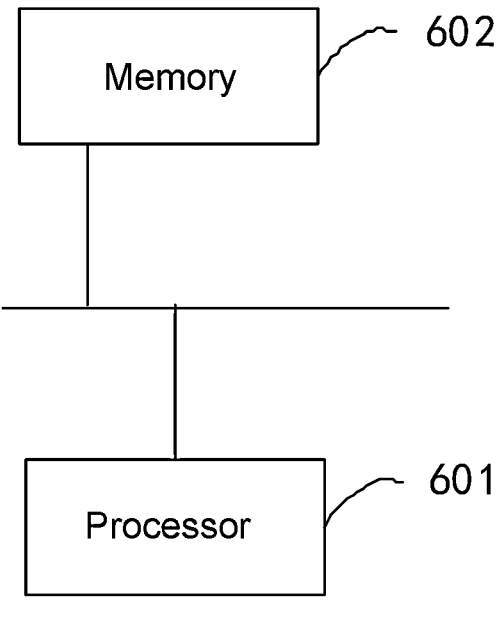
FIG. 6 is a schematic structural diagram of an electronic device according to an example of the disclosure.

The embodiments of the disclosure further provide an electronic device. As shown in FIG. 6, the electronic device includes at least one processor 601, and a memory 602 communicatively connected to the at least one processor 601. The memory 602 stores an instruction executable by the at least one processor 601, and the instruction is executed by the at least one processor 601, to cause the at least one processor 601 to execute the above communication method for an external device.

The memory and the processor are connected by means of a bus. The bus may include any number of interconnected buses and bridges. The bus connects various circuits of one or more processors and memory together. The bus may also connect various other circuits, for example, a peripheral, a voltage regulator, a power management circuit, etc., which are well known in the art and therefore will not be described further herein. A bus interface provides an interface between the bus and a transceiver. The transceiver may be one or more elements, such as a plurality of receivers and transmitters, which provide a unit configured to communicate with various other apparatuses over a transmission medium. Data processed by the processor is transmitted over a wireless medium by means of an antenna. Further, the antenna receives the data and sends the data to the processor.

The processor is responsible for managing the bus and general processing, and may also provide various functions, including timing, peripheral interfaces, voltage regulation, power management, and other control functions. The memory may be configured to store data used by the processor in execution operations.

The embodiments of the disclosure further provide a computer-readable storage medium, which stores a computer program. The computer program implements the above method example when executed by a processor.

That is, those skilled in the art can understand that all or some of steps in the method of the above embodiments can be implemented by instructing related hardware by means of a program. The program is stored in a storage medium and includes several instructions for making a device (which may be a microcontroller, a chip, etc.) or a processor execute all or some of the steps of the method described in each example of the disclosure. The foregoing storage medium includes: a USB flash disk, a mobile hard disk, a read-only memory (ROM), a random access memory (RAM), a magnetic disk, an optical disk and other media capable of storing program codes.

Those skilled in the art can understand that the above embodiments are specific embodiments for implementing the disclosure, and various changes in form and details may be made in practical application without departing from the spirit and scope of the disclosure.

What is claimed is:
1. A communication method for an external device, applied to a base station, and comprising:
allocating an internal Internet protocol (IP) address to the external device to access the base station, wherein the external device is connected to the base station through an Ethernet interface of a destination device;

12 searching corresponding relations between internal IP addresses and Ethernet interfaces for the Ethernet interface corresponding to the internal IP address that is allocated;
determining destination device information corresponding to the destination device to which the Ethernet interface that is found belongs;
searching model data of all external devices for model data comprising the destination device information, and establishing a corresponding relation between the model data that is found and the internal IP address that is allocated, wherein the model data is configured to identify the external device; and
communicating with the external device identified by the model data through the internal IP address corresponding to the model data.
2. The communication method for an external device according to claim 1, wherein the communicating with the external device identified by the model data through the internal IP address corresponding to the model data that is found comprises:
establishing a service channel with the external device identified by the model data through the corresponding internal IP address; and
communicating with the external device through the established service channel according to a customized application layer protocol.
3. The communication method for an external device according to claim 2, wherein the communicating with the external device through the established service channel according to a customized application layer protocol comprises:
periodically sending an alert request to the external device identified by the model data through the established service channel according to the customized application layer protocol;
parsing, in a case that an alert state message of the external device is received, the alert state message according to the customized application layer protocol, and obtaining an alert state of the external device; and
transmitting the alert state of the external device to a unified management expert.
4. The communication method for an external device according to claim 2, wherein before the establishing a service channel with the external device identified by a model data through the corresponding internal IP address, the method comprises:
obtaining an operation instruction issued by the unified management expert and based on the model data; and
obtaining the internal IP address corresponding to the model data according to the operation instruction based on the model data; and
the communicating with the external device through the established service channel according to a customized application layer protocol comprises:
transmitting the operation instruction to the external device through the established service channel according to the customized application layer protocol.
5. The communication method for an external device according to claim 4, wherein the operation instruction comprises any one or combination of a parameter configuration instruction, a version switching instruction, a file transfer instruction, and a user name and password change instruction; and in a case that the operation instruction is the parameter configuration instruction, the version switching instruction or the user name and password change instruction, the service channel that is established is a secure shell (SSH) service channel, and in a case that the operation instruction is the file transfer instruction, the service channel that is established is a secure file transfer protocol (SFTP) service channel.

6. The communication method for an external device according to claim 4, wherein in a case that the operation instruction comprises a password change instruction, after a response message indicating that password change of the external device succeeds is received from the service channel, the method further comprises:

storing a user name and a password into a database.

7. The communication method for an external device according to claim 1, wherein the communicating with the external device identified by the model data through the internal IP address corresponding to the model data comprises:

determining, according to the internal IP address in a message that is received, that the message is a message of the external device identified by the model data;

guiding the message of the external device identified by the model data to a virtual port of a service container by using a virtual local area network (VLAN) technology and a container technology; and monitoring the message at the virtual port in the service container.

8. A communication apparatus for an external device, comprising:

an allocation module, configured to allocate an internal IP address to the external device to access a base station, wherein the external device is connected to the base station through an Ethernet interface of a destination device;

a searching module, configured to search corresponding relations between internal IP addresses and Ethernet interfaces for the Ethernet interface corresponding to the internal IP address that is allocated; determine destination device information corresponding to the destination device to which the Ethernet interface that is found belongs; and search model data of all external devices for model data comprising the destination device information, and establishing a corresponding relation between the model data that is found and the internal IP address that is allocated, wherein the model data is configured to identify the external device; and a communication module, configured to communicate with the external device identified by the model data through the internal IP address corresponding to the model data.

9. An electronic device, comprising:

at least one processor; and a memory communicatively connected to the at least one processor; wherein the memory stores an instruction executable by the at least one processor, and the at least one processor is configured to:

allocate an internal Internet protocol (IP) address to the external device to access the base station, wherein the external device is connected to the base station through an Ethernet interface of a destination device;

search corresponding relations between internal IP addresses and Ethernet interfaces for the Ethernet interface corresponding to the internal IP address that is allocated;

determine destination device information corresponding to the destination device to which the Ethernet interface that is found belongs;

search model data of all external devices for model data comprising the destination device information, and establish a corresponding relation between the model data that is found and the internal IP address that is allocated, wherein the model data is configured to identify the external device; and communicate with the external device identified by the model data through the internal IP address corresponding to the model data.

10. A non-transitory computer-readable storage medium, storing a computer program, wherein the computer program is configured to, when executed by a processor, implement the communication method for an external device according to claim 1.

11. The non-transitory computer-readable storage medium according to claim 10, the computer program is further configured to establish a service channel with the external device identified by the model data through the corresponding internal IP address; and communicate with the external device through the established service channel according to a customized application layer protocol.

12. The non-transitory computer-readable storage medium according to claim 11, the computer program is further configured to:

periodically send an alert request to the external device identified by the model data through the established service channel according to the customized application layer protocol;

parse, in a case that an alert state message of the external device is received, the alert state message according to the customized application layer protocol, and obtaining an alert state of the external device; and transmitting the alert state of the external device to a unified management expert.

13. The non-transitory computer-readable storage medium according to claim 11, the computer program is further configured to:

obtain an operation instruction issued by the unified management expert and based on the model data;

obtain the internal IP address corresponding to the model data according to the operation instruction based on the model data; and transmit the operation instruction to the external device through the established service channel according to the customized application layer protocol.

14. The non-transitory computer-readable storage medium according to claim 13, wherein the operation instruction comprises any one or combination of a parameter configuration instruction, a version switching instruction, a file transfer instruction, and a user name and password change instruction; and in a case that the operation instruction is the parameter configuration instruction, the version switching instruction or the user name and password change instruction, the service channel that is established is a secure shell (SSH) service channel, and in a case that the operation instruction is the file transfer instruction, the service channel that is established is a secure file transfer protocol (SFTP) service channel.

15. The electronic device according to claim 10, the at least one processor is configured to:

establish a service channel with the external device identified by the model data through the corresponding internal IP address; and communicate with the external device through the established service channel according to a customized application layer protocol.

16. The electronic device according to claim 15, the at least one processor is configured to:

periodically send an alert request to the external device identified by the model data through the established service channel according to the customized application layer protocol;

parse, in a case that an alert state message of the external device is received, the alert state message according to the customized application layer protocol, and obtaining an alert state of the external device; and transmitting the alert state of the external device to a unified management expert.

17. The electronic device according to claim 15, the at least one processor is configured to:

obtain an operation instruction issued by the unified management expert and based on the model data;

obtain the internal IP address corresponding to the model data according to the operation instruction based on the model data; and transmit the operation instruction to the external device through the established service channel according to the customized application layer protocol.

18. The electronic device according to claim 17, wherein the operation instruction comprises any one or combination of a parameter configuration instruction, a version switching instruction, a file transfer instruction, and a user name and password change instruction; and in a case that the operation instruction is the parameter configuration instruction, the version switching instruction or the user name and password change instruction, the service channel that is established is a secure shell (SSH) service channel, and in a case that the operation instruction is the file transfer instruction, the service channel that is established is a secure file transfer protocol (SFTP) service channel.

19. The electronic device according to claim 17, the at least one processor is configured to:

store a user name and a password into a database.

20. The electronic device according to claim 10, the at least one processor is configured to:

determine, according to the internal IP address in a message that is received, that the message is a message of the external device identified by the model data;

guide the message of the external device identified by the model data to a virtual port of a service container by using a virtual local area network (VLAN) technology and a container technology; and monitor the message at the virtual port in the service container.

\* \* \* \* \*